Figure 1:
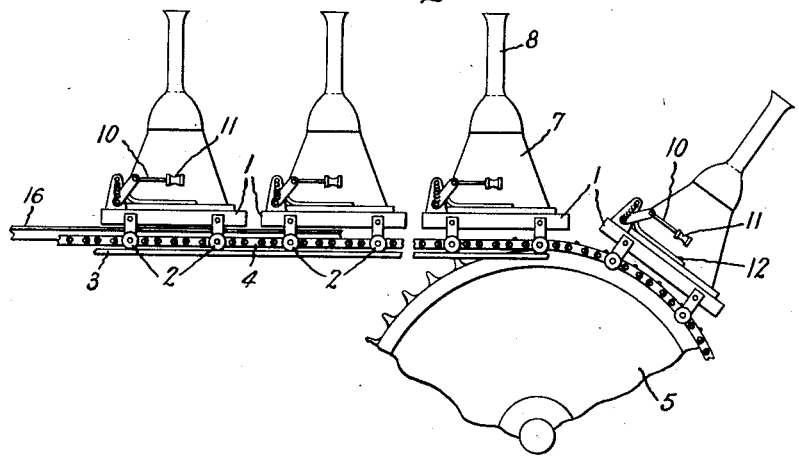

Dec. 15, 1953  P. W. KRAUSE  2,662,829
LIQUID SETTLING OF FLUORESCENT SCREENS
Filed Aug. 28, 1950

Inventor:
Paul W. Krause,
by Harry P. Mayers
His Attorney.

Patented Dec. 15, 1953

2,662,829

UNITED STATES PATENT OFFICE 2,662,829

LIQUID SETTLING OF FLUORESCENT SCREENS

Paul W. Krause, Syracuse, N. Y., assignor to General Electric Company, a corporation of New York Application August 28, 1950, Serial No. 181,799

7 Claims. (Cl. 117—33.5)

My invention relates to improved methods of liquid settling fluorescent screens and particularly to the application of heat to the face of a cathode ray tube during the settling of the screen.

As the volume of cathode ray tube manufacture has increased there has been a great demand for improvements in the processes of settling the screens. In accordance with one general type of process that has found wide application the phosphors are settled to the tube face through a large volume of liquid including a silicate solution and an electrolyte, such as barium nitrate or sodium sulphate for example. A liquid settling process using barium nitrate and other alkaline earth salts as electrolytes is described and claimed in copending Friedman application Serial No. 157,185, filed April 20, 1950 and assigned to the assignee of this application. The application of screens to the cathode ray tube faces by this general type of process involves both electrical and chemical phenomena and, while many of the basic considerations are known, the exact details of the reactions involved are not thoroughly understood. In accordance with prior art methods all efforts to utilize a control of temperature to improve the screening process have been along the lines of using refrigerated liquid in the cathode ray tubes and then controlling the ambient temperature to control the quality of the screen. The control thus effected is very limited, involves a rather long settling process, and is subject to great difficulty of control on a factory floor due to unwanted changes in ambient temperature which are not readily eliminated. For example, it is often true that the settling conveyors are located within a reasonably close distance to doors or other openings in the factory buildings which are opened at various times with the result that any process depending on a close control of ambient temperature is unsatisfactory.

In accordance with an important aspect of my invention I have found that the proper application of heat to the cathode ray tubes during settling greatly shortens the settling process and improves the quality of the resultant screens. For example, the proper application of heat, particularly to the face plates of the tubes, during the settling time hastens the jelling and binding action of the silicate solution, assists in the proper and even distribution of the phosphor over the cathode ray tube face, renders the process independent of variations in ambient temperature, and shortens the overall screening time. Also, the finished screen is of a finer texture and the screen material in its wet or damp state during the pour-off period of the excess liquid is much more rugged. These advantages combine to render the screens less affected by vibration on the settling conveyers and decrease the number of rejects due to defects in the screen.

While the process is applicable generally to the settling of phosphors on an extended surface, it is particularly suited to cathode ray tubes. In the manufacture of cathode ray tubes having envelopes of the type including a metal cone as a part of the envelope and a face plate of a thickness in the order of that commonly used for windows, the process is particularly effective since the required amount of heat is readily transferred through the face plate. These tubes are also often made for use with a wide sweep angle, that is, the slope of the cone is large. In tubes of this character, the face plate area is very large compared with the area of the upper surface of the settling liquid and the problem of getting an even distribution of the phosphor particularly at the outer edges of the face plate is great. The present invention is particularly advantageous as applied to tubes of this character.

My invention will be better understood by a consideration of examples of settling processes including the application of heat in accordance with the invention. Applying my invention to the screening of 10-inch cathode ray tubes, for example, the following procedure may be followed: The bulb is first supported in an upright position with the face down and 385 cc. of 4% of barium nitrate solution (water solution) is added to the bulb. Next, 2000 cc. of deionized water is added to the bulb to form what is called the cushion. When the cushion water has become motionless a phosphor suspension made up of 2.4 grams of the powdered phosphor, 300 cc. of potassium silicate solution and 300 cc. of water is poured on the cushion water and the liquid allowed to settle. Without the application of any heat and at a room temperature in the order of 26° C. to 30° C. approximately one-half hour of settling is required before the residual solution may be poured off without damaging the screen. In accordance with the present invention the face plate of the tube is subjected to radiant heating from infra red lamps or from heating units which preferably operate at a red heat. If the water that is added to the bulb is at room temperature, it is preferable to apply the heat a few minutes after the phosphor has been added. The heat is added for a period, in the example given, in the order of ten minutes during which time the screen is settled and obtains sufficient wet strength to permit pouring off of the supernatant liquid. The heat is applied substantially uniformly over the cathode ray tube face and the resultant temperature distribution within the tube, particularly with tubes employing a metal cone type of envelope, is such as to aid in distributing the phosphor evenly to the edge of the face plate. That is, the temperature is higher at the outer edge, due to the ready transfer of heat to the metal cone. In tubes of the glass envelope type, the face plate heating does not raise the liquid at the outer edge of the tube to a temperature higher than the central position to the extent that it does with the metal cone type of envelope, and this desired temperature distribution may be obtained in either glass or metal types by adding additional heat near the outer rim of the tube, as by surrounding it with a heating unit, for example, or by starting with refrigerated liquid as will be described in more detail at a later point in the specification.

The exact amount of heat to be added is not critical but certain limits must be observed in order not to effect detrimentally the distribution of the phosphor or to deteriorate the brightness of the finished phosphor screen. On a ten-inch tube, for example, to which the heat is applied for a period of ten minutes, the pour-off temperature of the liquid was approximately 45° C. Pour-off temperatures as high as 80° have been employed. In raising the liquid to pour-off temperatures of the above magnitude the actual face plate temperatures may reach as much as 150° C. to 160° C. While the process described above may be employed with any phosphor which is not detrimentally affected by the application of the heat, it has been used extensively with a zinc sulphide, zinc cadmium sulphide phosphor, which is one of the very widely used phosphors in the manufacture of television receiving tubes.

The potassium silicate solution referred to in the above example of the screening process is prepared by diluting a commercially available solution with an equal amount of water. The commercially available solution has, for example, the following specifications: Molecular ratio $1K^2O : 3.9\ SIO2$, percentage $K_2O = 7.8\%$, and specific gravity $= 1.25$. As is well understood, sodium silicate and variations of the above potassium silicate solution may be employed.

Also in the above example the undiluted potassium silicate solution was used in the amount of 150 cc. of a total liquid volume of about three liters, or in other words, about a 5% solution. The concentration may be varied appreciably, for example, between 2½% to 10%.

Instead of delaying the application of heat until a few minutes after the introduction of the phosphor into the tube in the order of 3 or 4 minutes, very successful application of the screen, including a good distribution, has been obtained by starting with the original liquid introduced into the bulb at a temperature substantially below room temperature, in the order of 16° C., for example, and applying the heat to the tube face for several minutes before the phosphor is introduced. This process involving the refrigeration of the liquid and preheating sets up desirable currents (by raising the liquid at the rim to a higher temperature than that at the central part of the tube) to assist in the distribution of the phosphor over the screen. The heat is applied for a total period somewhat in the order of ten minutes after the screen material is introduced.

In carrying out the present invention, it is necessary to accomplish the pour-off of the residual liquid reasonably promptly since the accelerated jelling of the silicate, as a result of the heat, renders pour-off difficult if the jelling process is carried too far.

It will be apparent that variations may be made in heating time, final pour-off temperature, and the like without departing from my invention in its broader aspects. It must be borne in mind, however, that the heat affects the distribution of the phosphor, and this is a substantial benefit if the heat is applied to aid in distributing the phosphor to the edge of the face plate.

Figure 2:
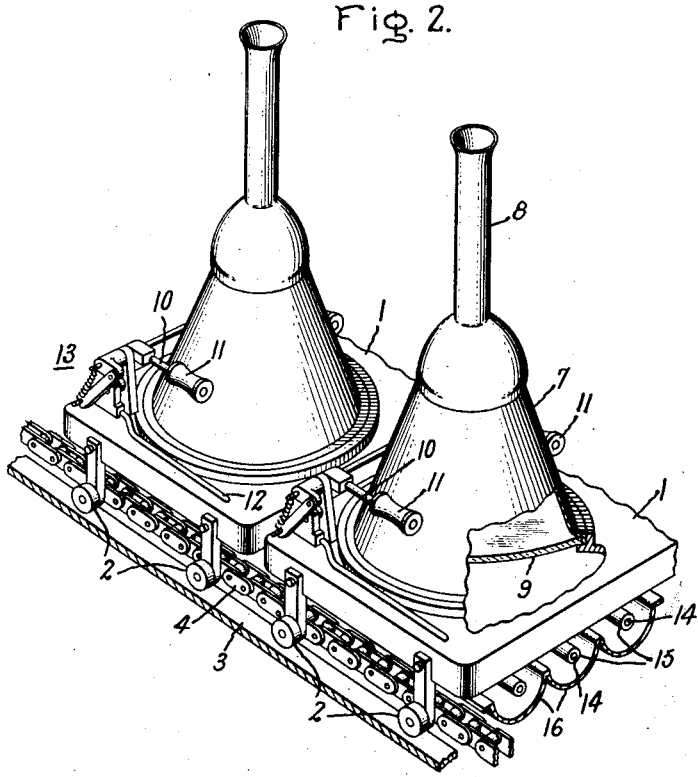

In the drawing I have illustrated a settling conveyer suitable for carrying out my invention on a continuous process basis. In the drawing Fig. 1 is an elevational view of a part of the conveyer at the pour-off end thereof and Fig. 2 is a perspective view of a portion of the conveyer illustrating the position of the heating units employed for heating the face plates of the tubes while the screens are settled. Referring now to the drawing, the conveyer includes a plurality of movable supports or plates 1, each of which is recessed appropriately to receive the rim of a cathode ray tube envelope and support it in inverted position. The supports are provided with rollers 2 which ride on a suitable track provided by a rigid structural member such as the channel 3. It will be appreciated that a similar channel is provided along the opposite side of the conveyer and that as many supports 1 may be provided in side-by-side relationship as are desired to give the conveyer the desired capacity. The supports 1 are mechanically linked together by a suitable sprocket 5.

The cathode ray tube envelopes illustrated in Figs. 1 and 2 are of the type including a metal cone 7, a glass neck 8 and a glass face plate 9. As previously indicated, the envelopes are supported in inverted position in suitable recesses formed in the supports 1 and are retained therein by suitable pivoted clamping arms 10 provided with envelope engaging resilient spools 11. The clamping arms are operated by an arm 12 through an overcenter linkage designated generally by the numeral 13. As shown in Fig. 2, suitable heating units extend longitudinally under the conveyer in the direction of the conveyer travel for that portion of the conveyer length traversed by the tube envelope during the period or periods in which it is desired to add heat to the face plates. These heating units may, for example, be in the form of long straight sheath units, including a central conductor 14 and an outer sheath 15. The units are preferably supported within suitable semi-cylindrical reflector units 16.

Inasmuch as it is preferable to supply heat to the face plates only during a predetermined portion of the travel of the tube envelopes along the conveyer, it will be understood that the heating units are appropriately placed. As illustrated in Fig. 1 these units are not employed just prior to the pour-off positions which, as illustrated in Fig. 1, are those positions of the envelope during which the supports 1 follow the contour of the sprocket 5. It will be readily appreciated that the materials are loaded into the inverted envelopes at a suitable station along the conveyer and that the speed of movement and the length of the coveyer are coordinated to provide the required settling time between the addition of materials and the pour-off of the supernatant liquid.

Screens manufactured in accordance with the present invention have the advantage of being sufficiently rugged to withstand vibration on the conveyer without damage. Also, lost motion in the conveyer which tends to cause a back wash during pour-off of the residual liquid does not produce any detrimental effect on screens settled in accordance with the present invention because of the superior wet strength of these screens as compared with those settled by prior art processes.

What I claim as new and desire to secure by Letters Patent of the United States is:

1. The method of liquid settling a fluorescent screen on the face plate of a cathode ray tube which comprises supporting the tube with the face plate thereof downward, introducing a substantial quantity of liquid into the tube including a silicate sol and a powdered phosphor suspension, said liquid having a temperature not higher than the temperature of the room in which settling is carried out, subjecting the face plate of the tube to infra red heating during settling of the phosphor from the suspension to raise the temperature thereof substantially above the temperature of the room in which the settling is carried out to assist in the distribution of the phosphor and accelerate the binding thereof to the face plate, and removing the residual liquid.

2. The method of liquid settling a fluorescent screen on the face plate of a cathode ray tube which comprises supporting the tube with the face plate thereof downward, introducing a substantial quantity of liquid at a temperature between 16° C. and 35° C. into the tube including a silicate sol and a powdered phosphor suspension, subjecting the face plate of the tube to heating during formation of the screen until the temperature of the liquid in the tube is at a temperature within the range of 35 to 80 degrees C., the higher final temperatures corresponding to the higher initial temperatures, and removing the residual liquid.

3. The method of liquid settling a fluorescent screen on the face of a cathode ray tube which comprises supporting the tube with the face plate thereof downward, introducing a substantial quantity of liquid into the tube including a silicate sol and a powdered phosphor suspension, said liquid having a temperature not higher than the temperature of the room in which settling is carried out, subjecting the face plate of the tube to heating after the addition of the phosphor suspension for a period of approximately ten minutes to raise the temperature of the liquid within the tube substantially above the temperature of the room in which the settling is carried out, and removing the residual liquid before the silicate solution has appreciably jelled.

4. The method of liquid settling a fluorescent screen on the face plate of a cathode ray tube which comprises supporting the tube with the face plate thereof downward, introducing a substantial quantity of refrigerated liquid including a silicate sol, the temperature of the liquid being substantially below the temperature of the room in which the settling is carried out, subjecting the face plate of the tube to heating for a period of several minutes, then adding a suspension of powdered phosphor, and continuing the heating for a substantial period after the addition of the phosphor and during the formation of the screen to raise the temperature of the liquid in the tube substantially above the starting temperature, and removing the residual solution.

5. The method of liquid settling a fluorescent screen on the face plate of a cathode ray tube which comprises supporting the tube with the face plate thereof downward, introducing a substantial quantity of water at a temperature between 16° C. and 35° C. into the tube including a silicate sol and a powdered suspension of a zinc sulphide, zinc-cadmium sulphide phosphor, subjecting the face plate to heating during formation of the screen for a period of approximately ten minutes to raise the temperature of the liquid to a temperature between 35 and 80 degrees C., the higher final temperatures corresponding to the higher starting temperatures, and pouring off the residual solution.

6. The method of liquid settling a fluorescent screen on the face plate of a cathode ray tube which comprises supporting the tube with the face plate thereof downward, introducing a substantial quantity of liquid into the tube including a silicate sol and a powdered phosphor suspension, said liquid having a temperature not higher than the temperature of the room in which settling is carried out, applying heat to the tube during settling of the phosphor and formation of the screen including the face plate to raise the temperature thereof substantially above the temperature of the room in which the settling is carried out and to raise the temperature of the liquid near the rim of the face plate to a higher temperature than the liquid at the center and removing the excess solution.

7. The method of liquid settling a fluorescent screen on the face plate of a cathode ray tube which comprises supporting the tube with the face plate thereof downward, introducing a substantial quantity of refrigerated liquid including a silicate sol, the temperature of the liquid being substantially below the temperature of the room in which the settling is carried out, subjecting the face plate of the tube to heating for a period of several minutes to set up convection currents in the solution, and then adding a suspension of powdered phosphor and continuing the heating for a substantial period after the addition of the phosphor to raise the temperature of the liquid in the tube substantially above the starting temperature, and removing the excess solution.

PAUL W. KRAUSE.

References Cited in the file of this patent

UNITED STATES PATENTS

| Number | Name | Date |
|---|---|---|
| 2,223,830 | Leverenz | Dec. 3, 1940 |
| 2,412,654 | Sadowsky | Dec. 17, 1946 |
| 2,451,590 | Tidik et al. | Oct. 19, 1948 |